United States Patent [19]

Stockstad et al.

[11] Patent Number: 5,521,488
[45] Date of Patent: May 28, 1996

[54] VOLTAGE REGULATOR AND METHOD THEREFOR

[75] Inventors: Troy L. Stockstad, Phoenix; Robert L. Vyne; Thomas D. Petty, both of Tempe, all of Ariz.

[73] Assignee: Motorola, Inc., Schaumburg, Ill.

[21] Appl. No.: 179,633

[22] Filed: Jan. 10, 1994

[51] Int. Cl.⁶ ..................................................... G05F 1/613
[52] U.S. Cl. ............................................ 323/223; 323/284
[58] Field of Search ....................................... 323/222, 223, 323/282, 283, 284, 351

[56] References Cited

U.S. PATENT DOCUMENTS

| | | | |
|---|---|---|---|
| 4,536,700 | 8/1985 | Bello et al. | 323/222 X |
| 4,622,511 | 11/1986 | Moore | 323/282 |
| 5,359,281 | 10/1994 | Barrow et al. | 323/284 |
| 5,396,412 | 3/1995 | Barlage | 323/222 X |
| 5,422,562 | 6/1995 | Mammano et al. | 323/282 |

Primary Examiner—Peter S. Wong
Assistant Examiner—Y. Jessica Han
Attorney, Agent, or Firm—Gary W. Hoshizaki

[57] ABSTRACT

A voltage regulator (11) having an input (12) for receiving an input current and an output (13) for providing a regulated voltage. The voltage regulator (11) comprising a diode (14), a capacitor (16), a first comparator (17), a second comparator (18), a logic circuit (19), and a switch circuit (21). The capacitor (16) is charged by the input current coupled through the diode (14). The first comparator (17) senses when the voltage on the capacitor (16) exceeds a first reference voltage and provides a signal to the logic circuit (19). The logic circuit (19) enables the switch circuit (21) for shunting the input current from charging the capacitor (19). The second comparator (18) senses when the voltage on the capacitor (16) falls below a second reference voltage and provides a signal to the logic circuit (19). The logic circuit (19) disables the switch circuit (21) from shunting the input current thereby charging the capacitor (19). Thus, the voltage at output (13) stays between the first and second predetermined voltages.

20 Claims, 2 Drawing Sheets

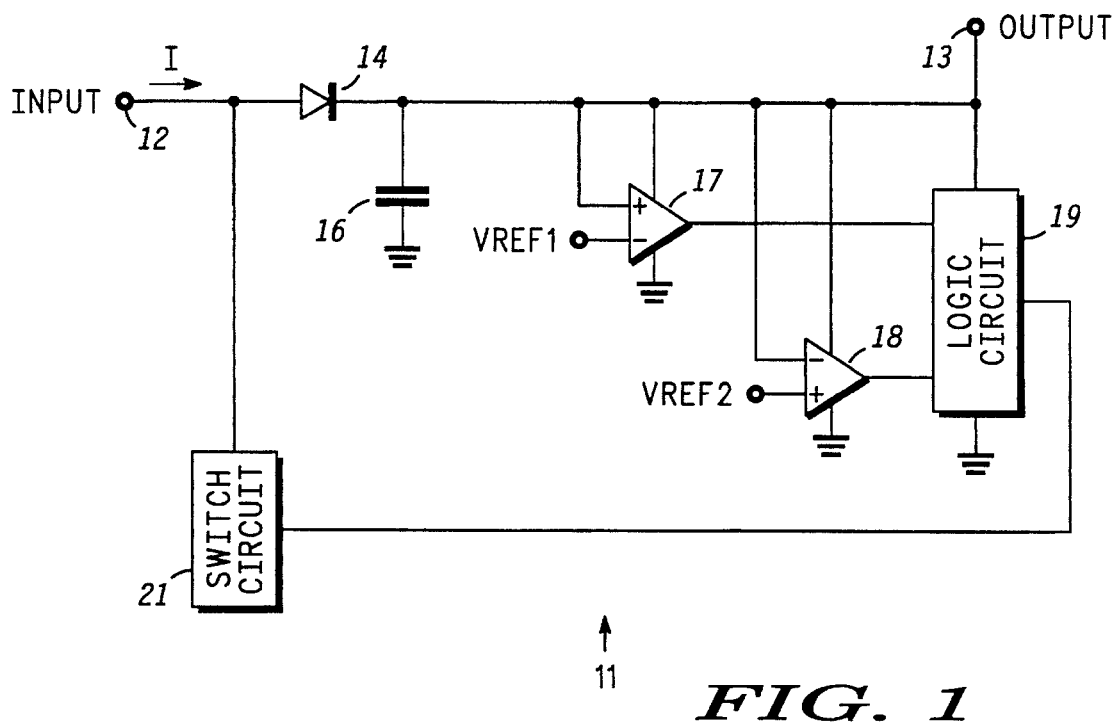
FIG. 1
FIG. 2
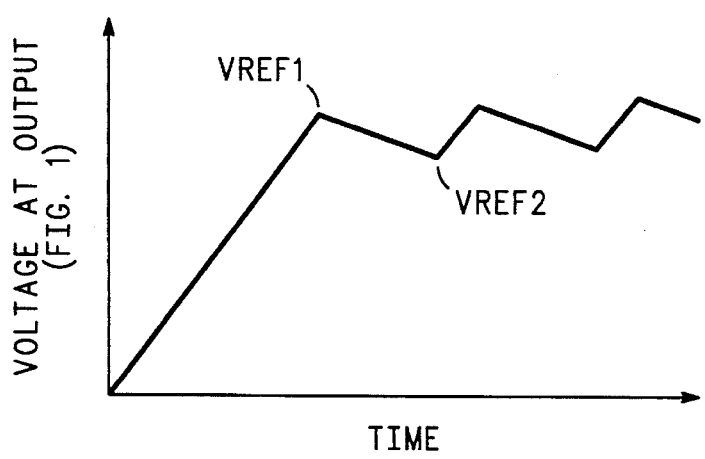

VOLTAGE REGULATOR AND METHOD THEREFOR

BACKGROUND OF THE INVENTION

This invention relates, in general, to regulators, and more particularly, to switching power supplies.

Motor protection circuitry is found on many types of motors for detecting failures and to deactivate the motor should a failure occur. One common type of motor which incorporates motor protection circuitry is a three phase motor. Motor protection circuitry for a three phase motor typically consists of circuitry to monitor the magnitude of current in the individual windings. The current must be within a predetermined range for the motor to be operating within specification. If the current of a winding is outside the predetermined range it could indicate a failure in the motor winding.

Initially, the motor protection circuitry used was electro-mechanical in nature. The electro-mechanical systems were assembled from discrete components. Motor manufacturers have pursued the development of solid state motor protection circuits to reduce cost and manufacturing complexity. The problem with solid state motor protection circuits is that they require some source of supply voltage to power the circuitry.

A battery may be used for a power supply, but this requires the user of the motor to periodically replace the battery. A separate power supply for powering the motor protection circuitry is not cost effective. An approach with merit is to derive the power for operating the circuitry from the motor windings itself. The current in the motor windings can be monitored by inductively coupling to windings with current transformers. The current transformer output is modeled as a controlled current source which is dependent on the loading of the motor. For example, a heavily loaded motor requires more current through the windings which also increases current from the current transformer. Conversely, a lightly loaded motor requires less current through the windings which decreases current from the current transformer. This current could also be used to develop a power supply voltage for the motor protection circuitry.

One method used to generate a regulated voltage source from an inductively generated current (from the motor windings) is to charge a capacitor with the current. A zener diode in parallel with the capacitor limits the voltage on the capacitor. The zener diode breaks down above a predetermined voltage. Forming a regulated voltage using this technique is undesirable for two reasons: first, the power dissipation of the zener diode is high at large input currents and second, the regulation of the voltage is poor over the wide range of motor windings available. The regulation can be poor at high currents due to the internal resistance of the zener diode.

It would be of great benefit if a voltage regulator circuit could be developed that provides a regulated voltage from an input current that operates over a wide variety of input currents and reduces power dissipation.

BRIEF DESCRIPTION OF THE DRAWINGS

FIG. 1 is a block diagram of a voltage regulator in accordance with the present invention;

FIG. 2 is a graph illustrating the output voltage of the voltage regulator of FIG. 1 versus time.

DETAILED DESCRIPTION OF THE DRAWINGS

Figure 3:
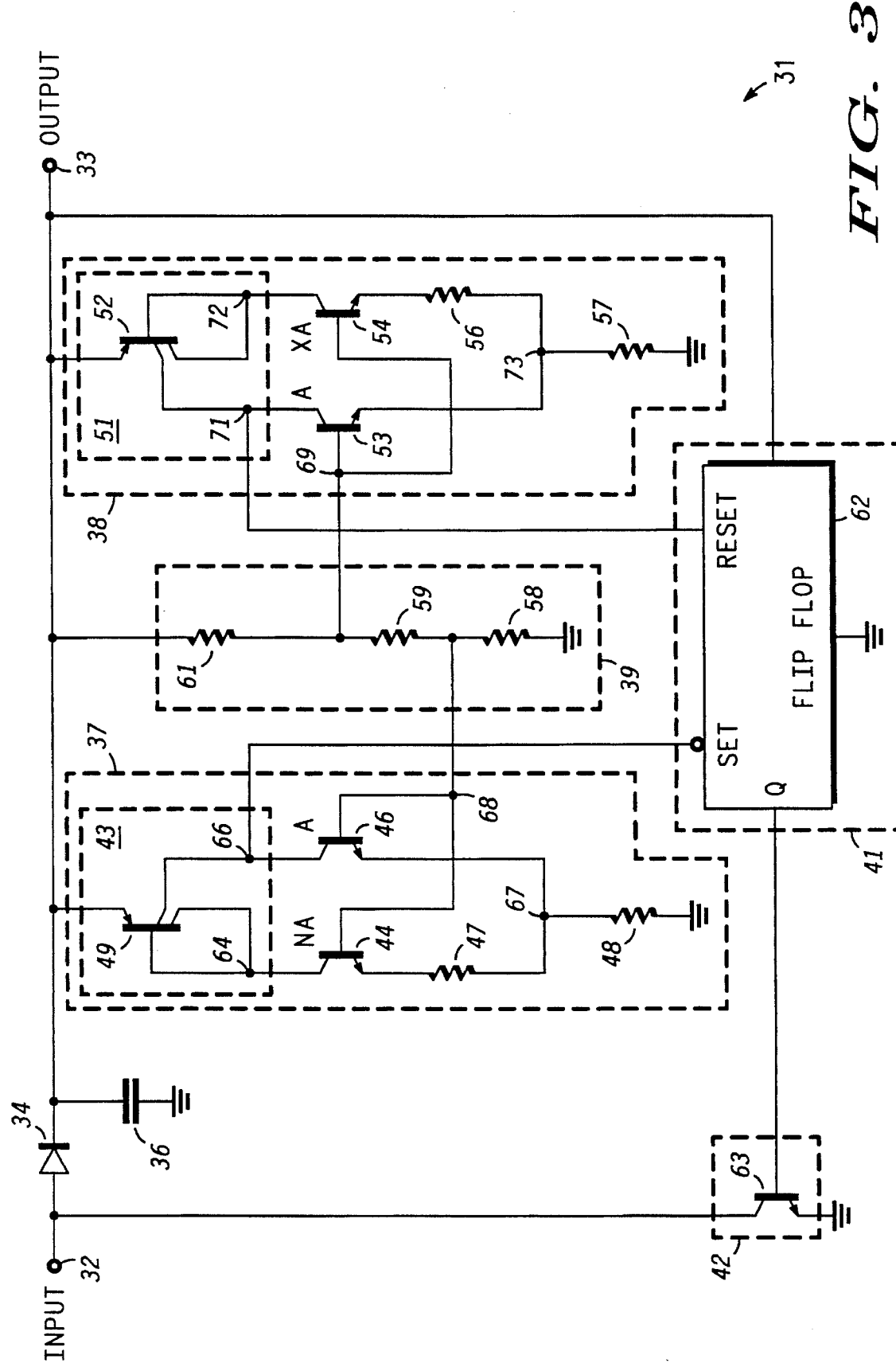
FIG. 3 is a schematic of a voltage regulator in accordance with the present invention.

FIG. 1 is a block diagram of a voltage regulator 11 that minimizes power dissipation. Voltage regulator 11 has an input 12 and an output 13 for providing a regulated voltage. Voltage regulator 11 comprises a diode 14, a capacitor 16, comparators 17 and 18, a logic circuit 19, and a switch circuit 21.

Diode 14 has a first terminal coupled to input 12 and a second terminal coupled to output 13. Diode 14 is used to decouple input 12 from output 13. Capacitor 16 stores charge and has a first terminal coupled to output 13 and a second terminal coupled for receiving a supply voltage (e.g. ground).

Comparators 17 and 18 sense voltage at output 13. In the preferred embodiment, comparator 17 has a non-inverting input coupled to output, a inverting output coupled for receiving a reference voltage VREF1, and an output. Comparator 18 has an inverting input coupled to output 13, a non-inverting output coupled for receiving a reference voltage VREF2, and an output. Both comparators 17 and 18 are powered by the voltage provided at output 13.

Logic circuit 19 has first and second inputs coupled to respectively to the outputs of comparators 17 and 18, and an output. Logic circuit 19 controls switch circuit 21. Switch circuit 21 shunts current applied to input 12 to ground. Switch circuit 21 is coupled between input 12 and the supply voltage (e.g. ground), and has a control input coupled to the output of logic circuit 19.

Operation of voltage regulator 11 is described hereinafter. Voltage regulator 11 generates a regulated voltage at output 13 from an input current applied at input 12 while minimizing power dissipation. Although not illustrated in FIG. 1, output 13 is coupled to circuitry which requires the regulated voltage to operate and will discharge capacitor 16. The regulated voltage must be provided over a wide range of input currents. For example, input currents could range from 50 microamperes to over 200 milliamperes. Standard voltage regulation techniques are not adequate over a wide input current range due to the increased power that would be dissipated at high input currents. For example, a zener diode coupled in parallel to capacitor 16 would provide a regulated voltage as is well known. The power dissipation problem occurs when the zener diode dissipates the power produced at high input currents. A 10 volt zener diode receiving 200 milliamperes of current will dissipate 2 watts. Voltage regulator 11 eliminates the need for high power packages or devices.

Referring to FIG. 1, an input current is applied to input 12. Two modes of operation occur depending on the regulated voltage at the output 13. In the first mode of operation, the input current charges capacitor 16 via diode 14. Capacitor 16 stores charge for powering circuitry (not illustrated) coupled to output 13. Comparator 17 senses the regulated voltage on output 13. Comparator 17 provides a signal to logic circuit 19 indicating the regulated voltage has exceeded a reference voltage VREF1. Logic circuit 19 then provides a control signal to switch circuit 21 that enables switch circuit 21 for shunting the input current to ground. Thus, capacitor 16 is no longer being charged by the input current. Diode 14 prevents the switching circuitry from discharging the capacitor. It should be noted that in the preferred embodiment, switch circuit 21 causes input 12 to approach the ground potential.

Minimizing the voltage drop across switch circuit 21 reduces power dissipation when shunting current. Logic circuit 19 enables switch circuit 21 to shunt the input current until the regulated voltage falls below a reference voltage VREF2.

In the second mode of operation, capacitor 16 provides power to circuitry (not illustrated) coupled to output 13 (switch circuit 21 shunts the input current to ground). Capacitor 16 discharges and the regulated voltage falls from a peak of approximately VREF1. Comparator 18 senses the regulated voltage at output 13. Comparator 18 provides a signal to logic circuit 19 indicating that the regulated voltage has fallen below a reference voltage VREF2. Logic circuit 19 then provides a control signal to switch circuit 21 that disables switch circuit 21 from shunting current. The input current charges capacitor 16 increasing the regulated voltage from a minimum of approximately VREF2. The cycle repeats with capacitor 16 being charged to a voltage of VREF1, the input current being shunted to ground through switch circuit 21, capacitor 16 discharging to VREF2, and switch circuit 21 being disabled to allow the input current to recharge capacitor 16.

FIG. 2 is a graph illustrating the voltage at output 13 of low power voltage regulator 11 of FIG. 1 versus time. Initially, capacitor 16 (FIG. 1) is at ground potential. Input current provided at input 12 (FIG. 1) charges capacitor 16 until the voltage at output 13 exceeds VREF1, at which time switch circuit 21 (FIG. 1) shunts the input current. The regulated voltage at output 13 remains between VREF1 and VREF2 as described hereinabove.

FIG. 3 is a schematic of a voltage regulator 31 that dissipates low power. Voltage regulator 31 has an input 32 and an output 33. Voltage regulator 31 comprises a diode 34, a capacitor 36, comparators 37 and 38, a voltage divider 39, a logic circuit 41, and a switch circuit 42.

Diode 34 has a first terminal coupled to input 32 and a second terminal coupled to output 33. Diode 34 is used to decouple input 32 from output 33. Capacitor 36 stores charge and has a first terminal coupled to output 33 and a second terminal coupled for receiving a supply voltage (e.g. ground).

Comparators 37 and 38 include transistors 44, 46, 49, and 52–54 each having a collector, a base, and a emitter corresponding respectively to a first electrode, a control electrode, and a second electrode. Comparator 37 comprises transistors 44 and 46, current mirror circuit 43, and resistors 47 and 48. In the preferred embodiment, current mirror circuit 43 comprises transistor 49. Transistor 49 is a split collector pnp transistor wherein the first collector corresponds to the first electrode and the second collector corresponds to a third electrode. Transistor 49 mirrors the collector current of transistor 44 to node 66 and has the first collector coupled to a node 64, the second collector coupled to a node 66, the base coupled to node 64, and the emitter coupled to output 33. Transistors 44 and 46 are npn transistors. Transistor 44 has an emitter area or conductive area (NA) N times larger than the emitter area (A) of transistor 46. Transistor 44 has the collector coupled to node 64 and the base coupled to a node 68. Transistor 46 has the collector coupled to node 66, the base coupled to node 68, and the emitter coupled to a node 67. Resistor 47 has a first terminal coupled to the emitter of transistor 44 and a second terminal coupled to node 67. Resistor 48 has a first terminal coupled to node 67 and a second terminal coupled for receiving a supply voltage (e.g. ground).

Comparator 38 is similar in design to comparator 37. Comparator 38 comprises transistors 53 and 54, current mirror circuit 51, and resistors 56 and 57. In the preferred embodiment, current mirror circuit 51 comprises transistor 52. Transistor 52 is a split collector pnp transistor wherein the first collector corresponds to the first electrode and the second collector corresponds to a third electrode. Transistor 52 mirrors collector current of transistor 54 to node 71 and has the first collector coupled to a node 72, the second collector coupled to a node 71, the base coupled to node 72, and the emitter coupled to output 33. Transistors 53 and 54 are npn transistors. Transistor 54 has an emitter area or conductive area (XA) X times larger than the emitter area (A) of transistor 53. Transistor 54 has the collector coupled to node 72 and the base coupled to a node 69. Transistor 53 has the collector coupled to node 71, the base coupled to node 69, and the emitter coupled to a node 73. Resistor 56 has a first terminal coupled to the emitter of transistor 54 and a second terminal coupled to node 73. Resistor 57 has a first terminal coupled to node 73 and a second terminal coupled for receiving a supply voltage (e.g. ground).

Voltage divider circuit 39 provides ratioed voltages corresponding to the voltage at output 33. In the preferred embodiment, voltage divider circuit 39 is a resistor divider. Other voltage divider circuits such as ratioed transistors could also be used. Voltage divider circuit 39 comprises resistors 58, 59, and 61. Resistor 61 has a first terminal coupled to output 33 and a second terminal coupled to node 69. Resistor 59 has a first terminal coupled to node 69 and a second terminal coupled to node 68. Resistor 58 has a first terminal coupled to node 68 and a second terminal coupled for receiving a supply voltage (e.g. ground). The resistor divider attenuates the regulated voltage at output 33 presented to comparators 37 and 38 without introducing temperature drift errors since resistors 58, 59, and 61 track with temperature.

Logic circuit 41 controls switch circuit 42. In the preferred embodiment, logic circuit 41 is a flip flop 62. Flip flop 62 has a setbar input coupled to node 66, a reset input coupled to node 71, and a Q output. Flip flop 62 is powered by the voltage supplied at output 33.

Switch circuit 42 shunts current to ground. The voltage across switch circuit 42 has a small magnitude when shunting current to minimize power dissipated by voltage regulator 31. In other words switch circuit 42 pulls input 32 close to ground when enabled. In the preferred embodiment, switch circuit 42 is a transistor 63. Transistor 63 is a npn transistor having a collector, a base, and an emitter corresponding to a first electrode, a control electrode, and a second electrode. Transistor 63 has the collector coupled to input 32, the base coupled to the Q output of flip flop 62, and an emitter coupled for receiving a supply voltage (e.g. ground). It should be obvious to one skilled in the art that other variations could be used for shunting current to ground such as an SCR, a MOSFET, or a mechanical switch.

Operation of voltage regulator circuit 31 is described hereinafter. An input current is applied to input 32 for charging capacitor 36. Diode 34 isolates input 32 from output 33. Capacitor 36 acts as a battery to maintain a regulated voltage at output 33 when no input current is provided.

An upper boundary of the regulated voltage is determined by comparator 37. Comparator 37 senses or detects when the regulated voltage at output 33 is greater than a first predetermined voltage. Comparator 37 is responsive to a voltage provided by voltage divider circuit 39 at node 68. Voltage divider circuit 39 provides a first reference voltage VREF1 at node 68 when the regulated voltage at output 33 is equal to the first predetermined voltage. Comparator 37 provides a zero logic level to logic circuit 41 indicating that the regulated voltage at output 33 has exceeded the first predetermined voltage. The zero logic level provided by comparator 37 sets flip flop 62 of logic circuit 41 thereby enabling transistor 63 of switch circuit 42. In the preferred embodiment, transistor 63 shunts the input current to ground such that the voltage drop from collector to emitter of transistor 63 is made as small as possible to minimize power dissipation. In this state, capacitor 36 is no longer charged by the input current.

Comparator 37 provides a one logic level to logic circuit 41 when voltage divider circuit 39 at node 68 falls below than VREF1. In the preferred embodiment, comparator 37 transitioning from the zero logic level to the one logic level does not affect logic circuit 41. Logic circuit 41 maintains switch circuit 42 in an enabled state.

A lower boundary of the regulated voltage is determined by comparator 38. Comparator 38 senses or detects when a regulated voltage at output 33 is less than a second predetermined voltage. Enabling switch circuit 42 (as described above) removes the input current from charging capacitor 36. Capacitor 36 provides charge to voltage regulator circuit 31 as well as any other circuits (not shown) coupled to output 33. Capacitor 36 discharges with time reducing the regulated voltage at output 33. Voltage divider circuit 39 provides a second reference voltage VREF2 at node 69 when the regulated voltage at output 33 is equal to the second predetermined voltage. Comparator 38 provides a one logic level to the reset input of flip flop 62 when the regulated voltage is less than the second predetermined voltage. The one logic level disables switch circuit 42 thereby allowing the input current to charge capacitor 36.

Comparator 38 provides a zero logic level to logic circuit 41 when voltage divider circuit 39 at node 69 exceeds VREF2. In the preferred embodiment, comparator 38 transitioning from the one logic level to the zero logic level does not affect logic circuit 41. Logic circuit 41 maintains switch circuit 42 in a disabled state.

Comparator 37 is designed to provide the zero logic level indicating the regulated voltage has exceeded the first predetermined voltage by choosing a specific conductive area ratio for transistors 44 and 46, as well as specific magnitudes for resistors 47 and 48. An internal switch point of comparator 37 is defined by equal currents biasing transistors 44 and 46 at the first reference voltage VREF1. The voltage at node 68 (V68) when this occurs is described by equation 1.

$$V68 = VREF1 = 2*(R48/R47)*(kT/q)*\ln(N) + Vbe(T46) \quad 1)$$

N is the conductive area (emitter area) ratio of transistors 44 and 46 where transistor 44 has a conductive area N times larger than that of transistor 46. T is the temperature, k is Boltzmann's constant, q is charge, and Vbe(T46) is the base-emitter voltage of transistor 46. The first term $(2*(R48/R47)*(kT/q)*\ln(N))$ of equation possesses a positive temperature coefficient while the second term (Vbe(T46)) possesses a negative temperature coefficient. By choosing VREF1 to be equal to the bandgap voltage of silicon (approximately 1.2 volts), the positive and negative temperature coefficients will cancel yielding a zero temperature coefficient at the internal switch point.

Operation above and below the internal switch point of comparator 37 generates an output logic state. For example, the current of transistor 46 is greater than the current of transistor 44 when the voltage provided by voltage divider circuit 39 is greater than the first reference voltage VREF1. This corresponds to the condition when the regulated voltage at output 33 exceeds the first predetermined voltage. In this state, the current of transistor 46 is greater than the current of transistor 44 due to resistor 47 degenerating the exponential voltage to current characteristics of transistor 44 as is well known by one skilled in the art. Transistor 49 is biased by current from transistor 44 and provides a current having a substantially equal magnitude to node 66. Thus, the current provided by transistor 49 is less than the current of transistor 46 causing a negative voltage transition at node 66 that generates the zero logic level.

Conversely, when the voltage provided by voltage divider circuit is less than the first reference voltage VREF1, the current of transistor 44 is greater than the current of transistor 46. This corresponds to the regulated voltage being less than the first predetermined voltage. In this state, the current of transistor 44 is greater than that of transistor 46 due to the fact that transistor 44 has a larger conductive area (emitter area) than transistor 46 such that the voltage across resistor 47 is not large enough to significantly debias transistor 44. Transistor 49 mirrors the current of transistor 44 to node 66. Thus, the current provided by transistor 49 is greater than the current of transistor 46 causing a positive transition on node 66 and generating the one logic level.

Operation of comparator 38 is similar to that of comparator 37 except that the internal switch point has been changed to the second reference voltage VREF2. The internal switch point of comparator 38 is defined by equal currents biasing transistors 53 and 54 at the second reference voltage VREF2. The voltage at node 69 (V69) when this occurs is described by equation 2.

$$V69 = VREF2 = 2*(R57/R56)*(kT/q)*\ln(X) + Vbe(T53) \quad 2)$$

X is the conductive area (emitter area) ratio of transistors 53 and 54 where transistor 54 has a conductive area X times larger than that of transistor 53. Transistor 52 mirrors current of transistor 54 to node 71. In the first mode of operation for comparator 38 (described above), transistor 53 has a larger current than transistor 54. This produces a negative voltage transition at node 71 generating the zero logic state when the voltage at node 69 of voltage divider circuit 39 is greater than VREF2. In the second mode of operation for comparator 38, transistor 54 has a larger current than transistor 53. This produces a positive voltage transition at node 71 generating the one logic level when the voltage at node 69 is less than VREF2.

By now it should be appreciated that a voltage regulator circuit has been provided. The voltage regulator circuit can withstand high current input drive without dissipating large amounts of power, requires no large power devices, and is self-biasing (does not require an external voltage source).

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. A voltage regulator circuit having an input for receiving an input current and an output for providing a regulated voltage comprising:

a diode having a first terminal and a second terminal coupled respectively to the input and the output of the voltage regulator circuit;

a capacitor for storing charge having a terminal coupled to the output of the voltage regulator circuit;

a first comparator responsive to the regulated voltage for sensing when the regulated voltage is greater than a first reference voltage;

a second comparator responsive to the regulated voltage for sensing when the regulated voltage is less than a second reference voltage;

a logic circuit responsive to said first and second comparators for providing a control signal; and a switch circuit responsive to said control signal for shunting the input current of the voltage regulator circuit from charging said capacitor.

2. The voltage regulator circuit as recited in claim 1 wherein said switch circuit is enabled for shunting the input current of the voltage regulator circuit by said logic circuit when the regulated voltage exceeds said first reference voltage.

3. The voltage regulator circuit as recited in claim 2 wherein said switch circuit is disabled from shunting the input current by said logic circuit when the regulated voltage is less than said second reference voltage thereby charging said capacitor.

4. The voltage regulator circuit as recited in claim 1 wherein said first reference voltage is greater than said second reference voltage.

5. The voltage regulator circuit as recited in claim 1 wherein said switch circuit comprises a transistor having a first electrode coupled to the input of the voltage regulator circuit, a control electrode responsive to said control signal of said logic circuit, and a second electrode coupled for receiving a supply voltage.

6. A voltage regulator circuit having an input for receiving an input current and an output for providing a regulated voltage comprising:

a diode having a first terminal and a second terminal coupled respectively to the input and the output of the voltage regulator circuit;

a capacitor for storing charge having a terminal coupled to the output of the voltage regulator circuit;

a voltage divider circuit for providing a first voltage and a second voltage, said first and second voltages each being a predetermined ratio of the regulated voltage;

a first comparator responsive to said first voltage for sensing when the regulated voltage is greater than a first predetermined voltage;

a second comparator responsive to said second voltage for sensing when the regulated voltage is less than a second predetermined voltage;

a logic circuit responsive to said first and second comparators for providing a control signal; and a switch circuit responsive to said control signal for shunting the input current of the voltage regulator circuit from charging the capacitor.

7. A voltage regulator circuit as recited in claim 6 wherein said voltage divider circuit comprises a resistor divider, said resistor divider including:

a first resistor having a first terminal coupled to the output of the voltage regulator circuit and a second terminal for providing said second voltage;

a second resistor having a first terminal coupled to said second terminal of said first resistor and a second terminal for providing said first voltage; and a third resistor having a first terminal coupled to said second terminal of said second resistor and a second terminal coupled for receiving a supply voltage.

8. A voltage regulator circuit as recited in claim 6 wherein said first comparator comprises:

a current mirror circuit having a first terminal and a second terminal;

a first transistor of a second conductivity type having a first electrode coupled to said first terminal of said current mirror circuit, a control electrode responsive to said first voltage, and a second electrode;

a second transistor of said second conductivity type having a first electrode coupled to said second terminal of said current mirror circuit, a control electrode responsive to said first voltage, and a second electrode;

a first resistor having a first terminal coupled to said second electrode of said first transistor and a second terminal coupled to said second electrode of said second transistor; and a second resistor having a first terminal coupled to said second electrode of said second transistor and a second terminal coupled for receiving a supply voltage.

9. A voltage regulator circuit as recited in claim 8 wherein said first and second transistors of said first comparator have conductive areas of a predetermined ratio and wherein a conductive area of said first transistor is greater than a conductive area of said second transistor.

10. A voltage regulator circuit as recited in claim 9 wherein said first and second transistors of said first comparator are biased with substantially equal currents when the regulated voltage is substantially equal to said first predetermined voltage.

11. A voltage regulator circuit as recited in claim 8 wherein said current mirror circuit of said first comparator comprises a transistor having a first electrode and control electrode coupled in common to said first terminal of said current mirror circuit, a second electrode coupled to the output of the voltage regulator circuit, and a third electrode coupled to the second terminal of said current mirror circuit.

12. A voltage regulator circuit as recited in claim 6 wherein said second comparator comprises:

a current mirror circuit having a first terminal and a second terminal;

a first transistor of a second conductivity type having a first electrode coupled to said first terminal of said current mirror circuit, a control electrode responsive to said second voltage, and a second electrode;

a second transistor of said second conductivity type having a first electrode coupled to said second terminal of said current mirror circuit, a control electrode responsive to said second voltage, and a second electrode;

a first resistor having a first terminal coupled to said second electrode of said first transistor and a second terminal coupled to said second electrode of said second transistor; and a second resistor having a first terminal coupled to said second electrode of said second transistor and a second terminal coupled for receiving a supply voltage.

13. A voltage regulator circuit as recited in claim 12 wherein said first and second transistors of said second comparator have conductive areas of a predetermined ratio and wherein a conductive area of said first transistor is greater than a conductive area of said second transistor.

14. A voltage regulator circuit as recited in claim 13 wherein said first and second transistors of said second comparator are biased with substantially equal currents when the regulated voltage is substantially equal to said second predetermined voltage.

15. A voltage regulator circuit as recited in claim 12 wherein said current mirror circuit of said second comparator comprises a transistor having a first electrode and control electrode coupled in common to said first terminal of said current mirror circuit, a second electrode coupled to the output of the voltage regulator circuit, and a third electrode coupled to the second terminal of said current mirror circuit.

16. A voltage regulator circuit as recited in claim 6 wherein said logic circuit is responsive to said first comparator for enabling said switch circuit to shunt the input current from charging said capacitor when the regulated voltage is greater than said first predetermined voltage.

17. A voltage regulator circuit as recited in claim 16 wherein said logic circuit is responsive to said second comparator for disabling said switch circuit when the regulated voltage is less than said second predetermined voltage thereby charging said capacitor with the input current.

18. A voltage regulator circuit as recited in claim 6 wherein said logic circuit comprises a flip flop having a set input responsive to said first comparator, a reset input responsive to said second comparator, and a Q output.

19. A voltage regulator circuit as recited in claim 6 wherein said switch circuit comprises a transistor having a first electrode coupled to the input of the voltage regulator circuit, a control electrode responsive to said logic circuit, and a second electrode coupled for receiving a supply voltage.

20. A method for generating a regulated voltage comprising:

providing a current to generate a charged voltage;

sensing said charged voltage;

shunting said current when said charged voltage exceeds a first predetermined voltage; and disabling said shunting of said current when said charged voltage falls below a second predetermined voltage.

* * * * *